United States Patent Office 3,181,351
Patented May 4, 1965

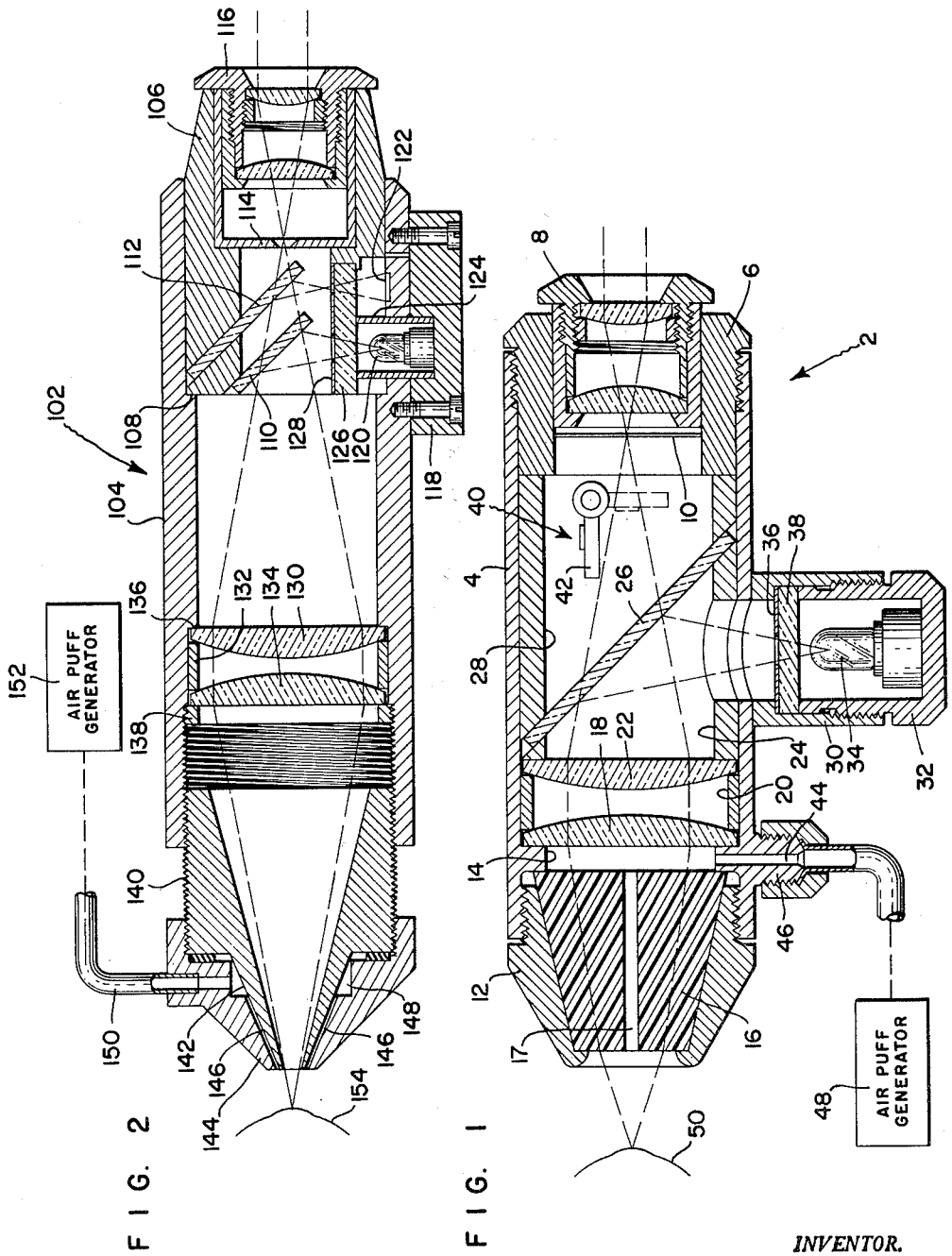

3,181,351
NON-CONTACTING TONOMETER
Norman L. Stauffer, Denver, Colo., assignor to Honeywell Inc., a corporation of Delaware
Filed Nov. 6, 1962, Ser. No. 235,723
10 Claims. (Cl. 73—80)

This invention relates to measuring apparatus, more particularly, to a medical measuring instrumentality.

In accordance with the teaching of medical practice, it has been found that certain malfunctions of the human eye, such as glaucoma, produce an increase in the intra-ocular pressure. One means which has been heretofore employed in the early diagnosis of such malfunctions is a tonometer which determines the change in the pressure of the fluid within the eyeball by mechanically depressing the corneal area of the eyeball and determining the intra-ocular pressure as a function of the amount by which the cornea is depressed. Such prior art tonometers have all required physical contact between the tonometer and the eyeball. Physical contact between the instrument and the eyeball introduces serious undesirable disadvantages. The instrument must be sterilized each time it is used; the eyeball must be anesthetized; the eyeball may be damaged by abrasion; the accuracy of the measurement is determined by the skill of the operator, the steadiness of his hand and the immobility of the patient.

A non-contacting tonometer which avoids the foregoing disadvantages is shown, described and claimed in a co-pending application of Curtis D. Motchenbacher, filed on even date herewith, and assigned to the same assignee as is the present invention.

It is an object of the present invention to provide a tonometer of the non-contacting type and which includes improved structural features.

It is another object of the present invention to provide an improved tonometer as set forth which features electro-optical detection means.

It is a further object of the present invention to provide an improved tonometer as set forth which includes improved means for accurately positioning the tonometer adjacent the eyeball under test.

In accomplishing these and other objects, there has been provided, in accordance with the present invention, a tonometer wherein the instrument is brought into close proximity to but not touching the eyeball under test, optical means being provided for accurately positioning the instrument relative to the eyeball. A calibrated puff of air is directed toward the corneal area of the eyeball under test, causing a deformation thereof, Electro-optical means are provided for determining the amount of such deformation as a measure of intra-ocular pressure.

A better understanding of this invention may be had from the following detailed description when read in connection with the accompanying drawing wherein:

FIG. 1 is a cross-sectional view of a tonometer constructed in accordance with the present invention, and FIG. 2 is a cross-sectional view of a similar but somewhat different structure for a tonometer also constructed in accordance with the present invention.

Referring now to the drawing in more detail there is shown, in FIG. 1, means for accomplishing non-contacting tonometry. In the form therein shown, the tonometer 2 comprises a structure within the prepositioning and the detection is accomplished through optical means. The structure includes a main barrel or body member 4. At one end of the body member 4 there is a first end cap 6 which is threaded into the body member 4. That first end cap 6 carries an adjustable ocular or eyepiece 8. Also carried by the first end cap 6 is a pair of cross-hairs 10 positioned in a plane whereupon the ocular 8 may be focused. The opposite end of the body member 4 has a second end cap 12 threaded thereinto. An annular shoulder 14 is formed within the body member 4 near the end thereof which carries the second end cap 12. Between the lower face of the shoulder 14 and the second end cap 12 there is clamped a suitable, optically transparent, plug 16 which has a relatively small central bore 17.

The upper surface of the shoulder 14 forms a reference plane for the optics of the system. The first lens 18 of a pair of objective lenses rests on the upper surface of the shoulder 14. A spacer ring 20 supports a second lens 22 of the pair of objective lenses and separates that lens 22 from the first lens 18. Above the second lens 22 there is a further spacer ring 24 which rests on the upper surface of the lens 22. The upper edge of the spacer ring 24 is cut off in a plane that makes an angle of 45° with the optical axis of the tonometer. That upper surface supports and positions a half-silvered mirror 26. A complementary spacer ring 28, with its lower end cut off in a plane at 45° with the optical axis of the system, is positioned above the half-silvered mirror 26. The entire assembly is then held firmly in place by screwing down the first end cap 6 into the barrel or body member 4 until the lower edge of the cap 6 bears firmly on the upper surface of the ring 28, thus clamping the several parts between the upper surface of the shoulder 14 and the lower end of the first cap 6.

The barrel or body member 4 also carries a housing for a light source. That housing comprises a smaller auxiliary barrel 30 which is secured to and extends outwardly from the main barrel or body member 4 perpendicularly to the axis of the main barrel and at an angle of 45° to the plane of the mirror 26. A cap member 32 carries within itself a light source means 34 and is threaded into the end of the auxiliary barrel 30. Between the end of the cap member 32 and the shoulder in the auxiliary barrel 30 there is clamped a suitable aperture plate 36 and an optical filter 38.

The main barrel or body member 4 further has mounted therein a detector unit 40 which includes a photocell 42. The detector unit 40 is pivotally mounted such that it may be swung out of the optical path during set-up or orientation of the tonometer, then moved into the optical path to detect the response of the cornea when the tonometer is operated.

Between the lower face of the lens 18 and the upper surface of the transparent plug 16 there is a space the thickness of which is determined by the thickness of the shoulder 14. An orifice of air passage 44 is provided through the wall of the body member 4 and the shoulder 14, opening into space between the lens 18 and the transparent plug 16. A suitable fitting or threaded boss 46 extends outwardly from the body member 4 whereby a connection may be made to a suitable source of controlled air-puffs or air-puffs generator 48.

In operation, the tonometer 2 is positioned adjacent an eyeball 50. The light source 34 is turned on and the light therefrom may be of any suitable wavelength characteristic. The light from the source 34 falls upon the half-silvered mirror 26 and is deflected toward the objective lens pair, lenses 18 and 22. The objective lenses cause the light to be focused at a point. The tonometer 2 is then moved, relative to the eyeball, such that the point at which the light from the source 34 comes to a focus coincides with the corneal surface of the eyeball 50. With the detector unit 40 swung out of the optical path, the light reflected from the surface of the eyeball 50 passes through the half-silvered mirror 26, past the crossed hairs 10, and through the ocular or eyepiece 8. By design, the optical distance from the objective lens pair to the light source 34 is made equal to the optical distance from the objective lens pair to the crossed hairs 10. Thus, by viewing through the ocular or eyepiece 8, the operator may properly adjust the tonometer relative to the eyeball. When the tonometer is properly positioned, the reflected image of the light source will appear superimposed on the crossed hairs 10 when viewed through the eyepiece 8.

With the tonometer 2 thus properly positioned, the detector unit 40 may be swung up into the optical path of the instrument so that the light reflected from the cornea of the eyeball 50 falls upon the photocell 42. That light establishes a reference level for the signal developed by the photocell, which may, in turn, be transmitted to suitable electronic measuring and indicating means (not shown). Under these conditions a predetermined puff of air is transmitted from the generator 48, through the inlet passage 44, out through the bore 17 toward the cornea of the eyeball 50. The surface of the eyeball will be deflected or deformed by the air-puff by an amount which is proportional to the intra-ocular pressure. That distortion produces a corresponding change in the intensity of the light falling on the photocell 43 due to the defocusing effect of the distortion. The photocell 42, in turn, produces a change in the electric signal developed thereby, which change is proportional to the intra-ocular pressure of the eyeball.

In FIG. 2, there is shown a tonometer which is similar to that shown in FIG. 1 but structurally differs somewhat thereofrom. In the structure shown in FIG. 2, the tonometer 102 includes a main barrel or body member 104. In one end of the body member 104 there is an end member 106 which is suitably secured in the body member 104 as by set-screws (not shown). The end member 106 is positioned within the body member 104 by abutment against a shoulder 108 formed within the body member 104. The end member 106 carries certain of the optical elements of the tonometer 102. Thus, a first half-silvered mirror 110 is carried in a suitable slot in the member 106. Similarly, a second half-silvered mirror 112 is carried in a second suitable slot in the member 106. These two mirrors are arranged parallel to each other and at an angle of 45° with respect to the optical axis of the tonometer. Also carried in the member 106 is an eyepiece assembly which includes an aperture plate 114 and a focusing eyepiece 116.

There is an opening through the side wall of the body member 104 adjacent the end which carries the member 106. A mounting block 118 is arranged to be secured to the side of the body member 104, covering that opening. The mounting block 118 carries, first, a source of light represented by the lamp 120, and, second, a light detector represented by the photo-cell 122. In order to isolate the photocell 122 from direct radiation from the light source 120, a light shield 124 surrounds the lamp. A light filter 126 is carried by the member 106 in a position relative to the light source 120 to limit to a desired band of wavelengths the radiation passed from the source 120 to the system. An aperture mask 128 is carried by the filter 126 having apertures therein which limit and define the beam of the transmitted light.

Mounted within the barrel or body member 104 is an objective lens pair including a first lens 130, a spacer 132 and a second lens 134. This pair of lenses is secured in position within the barrel 104 between a shoulder 136, formed in the barrel 104, and a clamping ring 138 threaded into the barrel 104.

A second end member 140 is also threaded into that end of the body member 104 which is opposite from the eyepiece 116. The second end member 140 is provided with a conical bore or opening longitudinally therethrough, as will be more fully explained hereinafter. Externally, the second end member 140 is cylindrical along the threaded portion, and is provided with a frusto-conical projection 142 extending from the end thereof opposite from the eyepiece 116. An end cap 144 is threaded onto the outer end of the second end member 140 and encircles the extension 142 of the member 140. The outer surface of the end cap member 144 is also frusto-conical in shape. Internally, the end cap 144 is generally substantially complementary of the surface of the end member 140, including the extension 142. The interior of the end cap 144 deviates from being exactly complementary in that, first, a plurality of small grooves 146 extend longitudinally along the inner conical surface of the cap, and, second, an annular groove 148 is provided about the inner surface of the end cap 144 at the base of the conical portion. An inlet post, represented by a pipe section 150 communicates with the annular groove 148 and with an air-puff generator 152. The radially outer ends of the longitudinal grooves 146 open into the annular groove 148. The radially inner ends of the grooves 146 open to the atmosphere.

In operation, energy is supplied to the lamp 120 by means of electrical leads (not shown). The tonometer 102 is placed in position near an eyeball 154 which is to be tested. The light radiating from the lamp 120 passes through the filter 126, is formed into a beam by the aperture plate 128, and impinges on the surface of the first salf-silvered mirror 110. The beam is thereby reflected toward the objective lens pair comprising the lenses 130 and 134. The beam is focused, by the objective lenses, to establish an image of the light source at a focal point slightly beyond the end of the tonometer, the beam passing through the conical bore in the end member 140. To this end, the conic solid angle defined by the bore through the end member is slightly larger than the solid angle defined by the focused beam.

If, now, the tonometer is moved, relative to the eyeball 154, to a position which coincides with the focus of the beam, the image of the light source will be formed on the surface of the eyeball 154. Under those conditions, the tonometer 102 will be a predetermined distance from the eyeball 154. In practice, the occurrence of the proper positioning of the tonometer may be determined by an observer viewing through the eyepiece 116. When the tonometer is properly positioned, the image of the light source formed on the cornea of the eyeball 150 will be reflected back through the tonometer, focused by the objective lenses 134 and 130 to form a reflected image at the aperture in the aperture plate 114 where it may be viewed through the eyepiece 116. In passing from the lens 130 to the eyepiece 116. In passing from the lens 130 to the eyepiece 116, the reflected beam must pass through the two half-silvered mirrors 110 and 112. At each of these two mirrors, a part of the incident beam is reflected.

At the first mirror 110, the reflected part of the beam is returned to the light source 120 and lost. At the second half-silvered mirror 112, the reflected part of the beam is directed to fall upon and be detected by the photocell 122. The photocell 122 is electrically connected by leads (not shown) to a suitable measuring and indicating apparatus of any suitable design.

When the tonometer 102 has been properly positioned, as indicated above, the amount or intensity of the reflected light falling on the photocell 122 produces a fixed or steady signal thereby. The air-puff generator 152 may then be actuated to produce one or more calibrated airpuffs. These air puffs are transmitted through the tube 150 to the manifold 148. From the manifold 148, the air-puffs are transmitted through the passages defined by the several grooves 146. The grooves 146, together with the conic surface 142 of the end member 140, define a plurality of jet nozzles which are all aimed at the same point, that point at which the image of the light source 120 is formed. When that image of the light source is formed on the eyeball 154, the air-puff jets are aimed at that spot on the eyeball. When the air-puff impinges on the eyeball, the surface of the eyeball is deformed or deflected by an amount which is proportional to the intensity of the air-puff and the intra-ocular pressure of the eyeball. As before, the deflection of the eyeball produces a defocusing of the optics, producing, in turn, a change in the intensity of the reflected light falling on the photocell 122. That much of the system operates in the same manner as does the corresponding features of the structure shown in FIG. 1. The primary distinction of the structure of FIG. 2 over that of FIG. 1 is that the operator or observer may continuously observe the image formed through the eyepiece 116; there is no necessity for the interruption of the reflected beam to bring the photocell into operating position. Another distinction is the manner of directing the air-puff jet toward the eyeball which eliminates the necessity of the transparent plug 54 of FIG. 1.

Thus, structure is provided which constitutes means for obtaining a tonometric measurement without the necessity of establishing physical contact between the measuring instrument and the eyeball. Inasmuch as there is no physical contact with the eyeball, there is no necessity for anesthetizing the eye, there is no necessity for sterilizing the equipment after each use, there is no likelihood of damaging the corneal area of the eyeball by abrasion, the operation can be performed more accurately and without the necessity of the high order of skill of the operator required by previous tonometers, and the structure provides means for accurately positioning the instrument relative to the eyeball under test.

What is claimed is:

1. A non-contacting tonometer comprising an elongated main body member, means defining an optical path coaxial with said body member, said path defining means including an optical eyepiece at one end of said body member and objective lens means within said body member, a light source means, means for injecting a light beam from said source means into said body member to coincide with said optical path, said objective lens means being arranged to focus said beam to form a first image of said source a slight distance beyond the end of said tonometer opposite from said eyepiece, said tonometer being positionable adjacent an eyeball to be tested whereat said first image is formed on said eyeball, said beam being reflected back into said tonometer by said eyeball to form a reflected beam, said objective lens means being effective to focus said reflected beam to produce a reflected image of said image at the focus of said eyepiece whereby to determine when said tonometer is properly positioned relative to said eyeball, a photocell, means for causing at least a part of said reflected beam to fall on said photocell, and means associated with the end of said tonometer opposite from said eyepiece for directing a predetermined puff of air against said eyeball to momentatrily deform said eyeball at the place of the formation of said first image thereon.

2. A non-contacting tonometer comprising an elongated main body member having an optical eyepiece at one end and an end assembly at the other end, means including an objective lens means within said body member and said eyepiece for defining an optical path coaxial path coaxial with said body member, a light source means, means including a half-silvered mirror for injecting a light beam from said source into said body member to coincide with said optical path, said objective lens means being effective to focus said beam to form an image of said source a slight distance beyond the extremity of said end assembly, said tonometer being positionable adjacent an eyeball to be tested whereat said image is formed on said eyeball, said beam being reflected back into said tonometer by said eyeball to form a reflected beam, said objective lens means being further effective to focus said reflected beam to produce a reflected image at the focus of said eyepiece whereby to determine when said tonometer is properly positioned relative to said eyeball, a photocell, means for causing at least a part of said reflected beam to fall on said photocell, and means including said end assembly for defining an air-puff nozzle means for directing a predetermined puff of air against said eyeball to momentarily deform said eyeball at the place of the formation of said image thereon.

3. A non-contacting tonometer as set forth in claim 2 wherein said end assembly includes a plug member which is transparent to said beam and an end cap for securing said plug member to said main body member.

4. The invention set forth in claim 3 wherein said means for defining an air-puff nozzle means includes said transparent plug member having a central bore therethrough.

5. The invention set forth in claim 4 characterized by the addition of an air-puff generator coupled to said tonometer for injecting said predetermined puff of air into said nozzle means.

6. The invention as set forth in claim 4 wherein said means for causing at least a part of said reflected beam to fall on said photocell includes a pivoted mounted means for said photocell whereby said photocell may be selectively moved into and out of said reflected beam.

7. A non-contacting tonometer as set forth in claim 2 wherein said end assembly includes an end member secured to said body member and having a substantially conical bore longitudinally therethrough and an end cap member secured to said end member.

8. The invention as set forth in claim 7 wherein said means for defining an air-puff nozzle means includes said end member and said end cap member having longitudinal groove means therebetween and an annular manifold connected to said groove means, said groove means being aimed at the point whereat said first mentioned image is formed.

9. The invention as set forth in claim 8 characterized by the addition of an air-puff generator coupled to said manifold for injecting said predetermined puff of air into said nozzle means.

10. The invention as set forth in claim 7 wherein said means for causing at least a portion of said reflected beam to fall on said photocell includes a second half-silvered mirror oriented to deflect said portion of said reflected beam onto said photocell.

References Cited by the Examiner
UNITED STATES PATENTS 2,552,189  5/51  Kuehni _____ 73—37 X
2,708,928  5/55  Zenatti _____ 73—80 X
2,852,849  9/58  Groener _____ 73—37.5 X
3,052,974  9/62  Williams _____ 73—37.5 X RICHARD C. QUEISSER, *Primary Examiner.*